United States Patent
Ch'ng

(10) Patent No.: US 7,299,278 B2
(45) Date of Patent: Nov. 20, 2007

(54) MANAGING NETWORK FAULTS

(75) Inventor: Shi Baw Ch'ng, Nashua, NH (US)

(73) Assignee: Airvana, Inc., Chelmsford, MA (US)

( * ) Notice: Subject to any disclaimer, the term of this patent is extended or adjusted under 35 U.S.C. 154(b) by 820 days.

(21) Appl. No.: 10/052,897

(22) Filed: Jan. 16, 2002

(65) Prior Publication Data

US 2003/0135610 A1    Jul. 17, 2003

(51) Int. Cl.
*G06F 15/173* (2006.01)
(52) U.S. Cl. .................. 709/224; 709/203; 714/47
(58) Field of Classification Search ............... 709/224, 709/203; 714/47; 702/58
See application file for complete search history.

(56) References Cited

U.S. PATENT DOCUMENTS 5,828,830 A * 10/1998 Rangaraian et al. .......... 714/48
5,961,594 A * 10/1999 Bouvier et al. ............. 709/223
6,292,472 B1 * 9/2001 Rariden et al. ............. 370/254
7,113,988 B2 * 9/2006 Chirashnya et al. ........ 709/224

OTHER PUBLICATIONS

Masum Hasan et al. "A Conceptual Framework for Network Management Even Correlation and Filtering Systems", Bell Laboratories, Lucent Technologies, 14 pages.
Malgorzata Steinder et al. "A Survey of Fault Localization Techniques in Computer Networks", Science of Computer Programming 53 (2004) pp. 165-194.

* cited by examiner

*Primary Examiner*—Ario Etienne
*Assistant Examiner*—Uzma Alam
(74) *Attorney, Agent, or Firm*—Fish & Richardson P.C.

(57) ABSTRACT

Information is processed about network faults that contribute to a failure of a network element in which the faults are occurring. Traps are sent to a network management station with respect to fewer than all of the faults that are occurring, based on the results of the information processing.

11 Claims, 5 Drawing Sheets

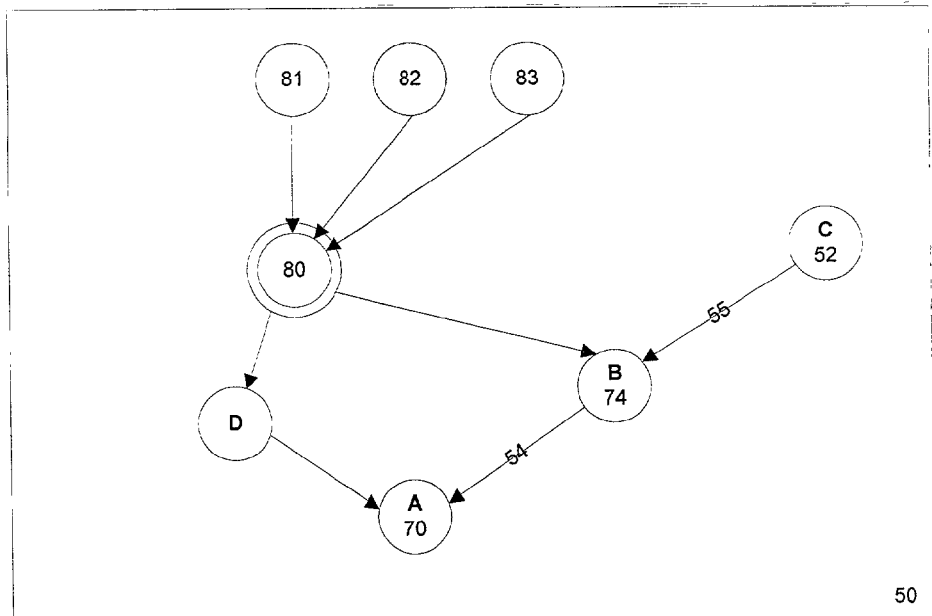

RULE 61: If C is faulty, then Fault C is a root cause fault if B is not faulty.
RULE 62: If B is faulty, then Fault B is a root cause fault if A is not faulty.
RULE 63: If A is faulty, then Fault A is a root cause fault.
RULE 64: If D is faulty, then Fault D is a root cause fault if A is not faulty.
RULE 65: 80 is considered faulty if and only if both B and D are faulty.
RULE 66: If 81 is faulty, then Faulty 81 is a root cause fault if 80 is not considered faulty.
RULE 67: If 82 is faulty, then Faulty 81 is a root cause fault if 80 is not considered faulty.
RULE 68: If 83 is faulty, then Faulty 81 is a root cause fault if 80 is not considered faulty.

Figure 3a

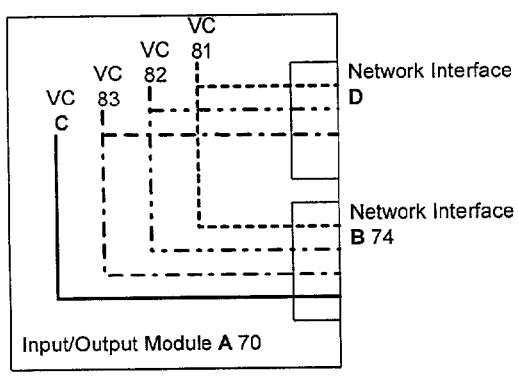

MANAGING NETWORK FAULTS

BACKGROUND

This invention relates to managing network faults.

Proper detection, reporting, and interpretation of faults are important activities in keeping networks working properly. As shown in FIG. 1, a network management station 10, can track fault notifications to help operators identify failure conditions within the network elements 12, 14, 16, 18, such as routers, switches, radio nodes, and radio network controllers. When a fault (i.e., an event that adversely affects the proper functioning of the network element) or other noteworthy event occurs at a network element, the element notifies the management station by "sending a trap" 20. In a large network, one management station may serve hundreds or even thousands of network elements.

A fault in one entity 11 of a network element may trigger cascading faults in other components 13, 15, 17 that rely on the faulty component for proper functioning. If a network element suffers a bout of cascading faults and sends a trap to the management station for each fault, the avalanche of traps may overload the management station. The operator 22 at the management station may also be overloaded by the amount of information carried in the traps and consequently be distracted from the key traps that report the root causes of the faults.

One way to reduce the number of traps processed at a management station is by "filtering" (i.e., purposefully ignoring traps that satisfy certain simple criteria). Alternatively, operators may instruct network elements not to send traps for certain classes of faults. However, the operator may inadvertently filter out traps that report the root causes of faults.

Other approaches, which run on management stations, examine previously logged fault records to correlate faults, apply data-mining techniques on logged faults to identify patterns that may point to the root causes of faults, and/or use expert-system techniques combined with externally specified rules to correlate logged faults.

SUMMARY

In general, in one aspect, the invention features a method that includes (a) processing information about network faults that contribute to a failure of a network element in which the faults are occurring, and (b) sending traps to a network management station with respect to fewer than all of the faults that are occurring, based on the results of the information processing.

Implementations of the invention may include one or more of the following features. The information is processed using a directed acyclic graph. Nodes of the graph represent entities of the network element. The result of the processing comprises information about the causal relationships among at least some of the faults. Traps are sent with respect to faults that have a causal relationship to other faults and traps are not sent with respect to at least some of the other faults. Fault information is requested from an entity that is part of the network element and which has not triggered a fault notice to determine if there is a fault associated with the network element.

In general, in another aspect, the invention features a method that includes at a network management station, receiving traps sent from network elements, the traps including information about at least some faults occurring in entities of the network elements, the traps not including information about at least some faults occurring in the entities.

Implementations of the invention may include one or more of the following features. The traps are reported to an operator of the network management station. The information included in the traps represents faults that have a causal relationship to other faults.

In general, in another aspect, the invention features a (a) network element having network entities that are subject to faults, the faults of at least some of the network entities having causal relationships to the faults of at least some of the network entities, and (b) a medium bearing information capable of configuring a machine in the network element to send traps based on the causal relationships to a network management station.

In general, in another aspect, the invention features a medium bearing information capable of configuring a machine to determine causal relationships among faults occurring in entities of a network element. In some implementations, the information includes a directed acyclic graph of nodes.

Among the advantages of the invention are one or more of the following. Management station and operator efficiency are improved by enabling network elements to be more discriminate in sending traps when reporting failure conditions. Network elements are empowered to correlate faults and to analyze their own failures before sending traps with the aim of reducing related failures to their root causes and sending traps only for the root causes. By so doing, the number of traps that the management station needs to process is significantly reduced and operators are presented with a manageable amount of relevant information that targets the root causes of failures.

Other advantages and features will become apparent from the following description and from the claims.

BRIEF DESCRIPTION OF DRAWINGS

FIG. 3a illustrates a directed acyclic graph.

FIG. 3b illustrates a plausible network element configuration that may be modeled by the directed acyclic graph in FIG. 3a.

DETAILED DESCRIPTION

Figure 1:
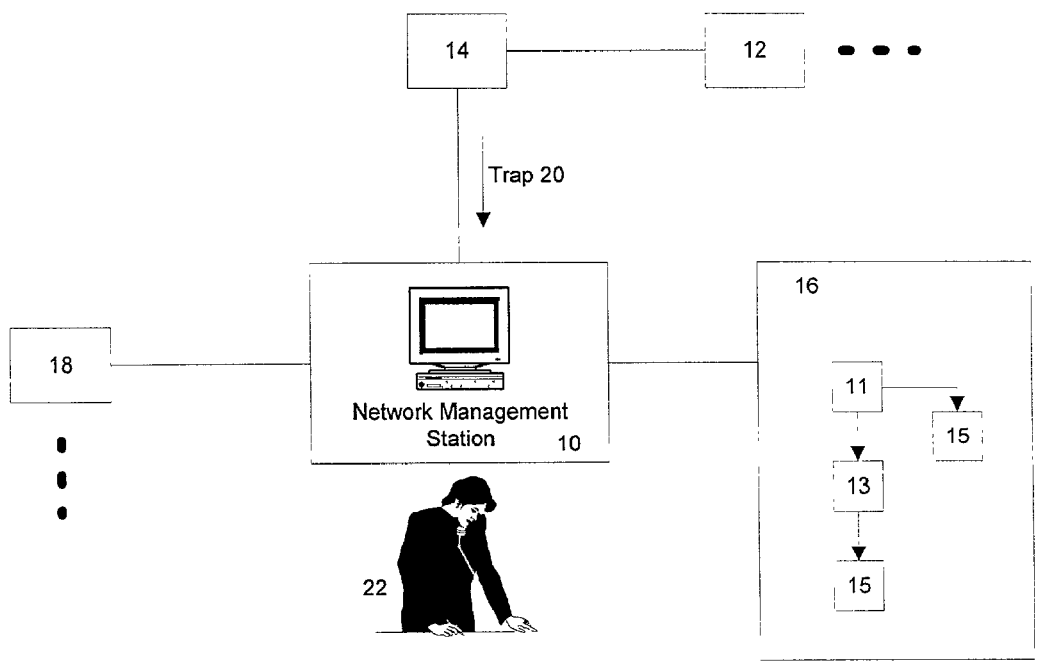
FIGS. 1 and 2 show networks.
Figure 2:
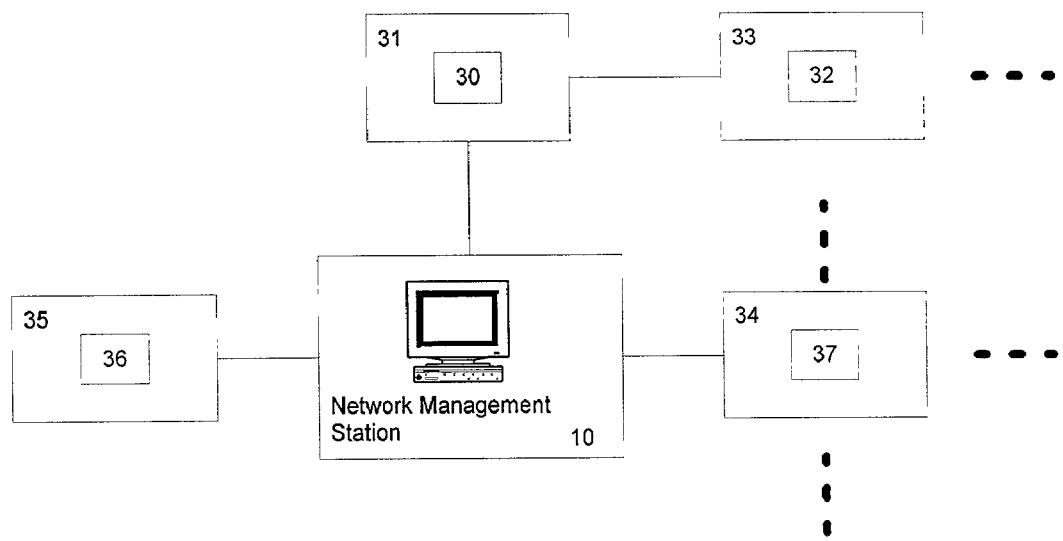

Referring to FIG. 2, in some implementations of the invention, a fault correlation task is performed by fault correlation software 30, 32, 36, 37 running in each of the network elements 31, 33, 34, 35. The software performs fault correlation using an object-oriented, graph-based model. By performing fault correlation in the network elements, the number of traps sent to management stations is reduced. The management station and the operator are presented with only relevant fault information targeting the root causes of faults.

As shown in FIG. 3a, if a fault A may cause a fault B, then we say that the existence of fault B implies the existence of fault A. If fault B may cause fault C but fault A by itself may not cause fault C, then C implies B but does not imply A. Each of the network elements contains its own FIDAG 50, which is designed to capture the relevant causal relationships for entities that belong to the respective elements. The network management station need not be aware of or control the content or organization of the FIDAG in any of the elements.

As shown in FIG. 3a, in the object-oriented graph-based fault model 50 running in each of the network elements, the entities that may generate faults are modeled as objects C 52, B 74, A 70, D, 81, 82, and 83 (known as fault objects).

For example, three virtual circuits (81, 82, 83) may be configured to load-balance across two physical network interfaces (D, B 74). Another virtual circuit C is configured to use only one physical network interface (B 74). Both physical network interfaces are located on the same Input/Output module (A 70).

For the purpose of being able to focus traps on the root causes of faults, the objects are organized in a directed acyclic graph 50 that models causal relationships 54, 55 between instances of fault objects. We call such graphs Fault Implication Directed Acyclic Graphs (FIDAGs).

Because a fault object 74, modeled as a node in a FIDAG, can be made inherently aware of its neighboring nodes 70, 52 in the graph (i.e., the software object that represents node 74 may contain references to software objects that represents node 52 and node 70; or be coded with enough logic to dynamically arrive at computation results that references node 52 and node 70 and recognize them as parent and child respectively), the fault correlation software can operate on fault correlation rules that are expressed in the structure of a FIDAG itself. Examples of the rules are shown at the bottom of FIG. 3 and correspond directly to the structure shown in the FIDAG. This precludes the need for an external fault correlation engine or externally specified correlation rules. Meta-fault objects that aggregate the logic of more than one fault object can be constructed to enhance the flexibility of the system to correlate faults. In this example (FIG. 3b), a meta-fault object 80 is used to aggregate fault objects D and B 74 to model redundantly configured entities in the fault model. In this case, the virtual circuits (81, 82, 83) are not disconnected (i.e., become faulty) if either interface D or B 74 becomes faulty. These virtual circuits will be disconnected if both D and B 74 become faulty. This situation is captured in the FIDAG in FIG. 3 as RULE 65. A meta-fault object, being an aggregate of other fault objects, cannot by itself be a root cause fault. Thus no trap will be sent to report fault on a meta-fault object.

Even though the above example uses a simplistic scenario where meta-fault object 80 represents a simple logical AND relationship of two object's fault states, more sophisticated aggregations can be implemented in a meta-fault object as well (e.g., a meta-fault object is considered faulty if m or more objects out of a group of n objects are faulty where m<n).

Figure 4:
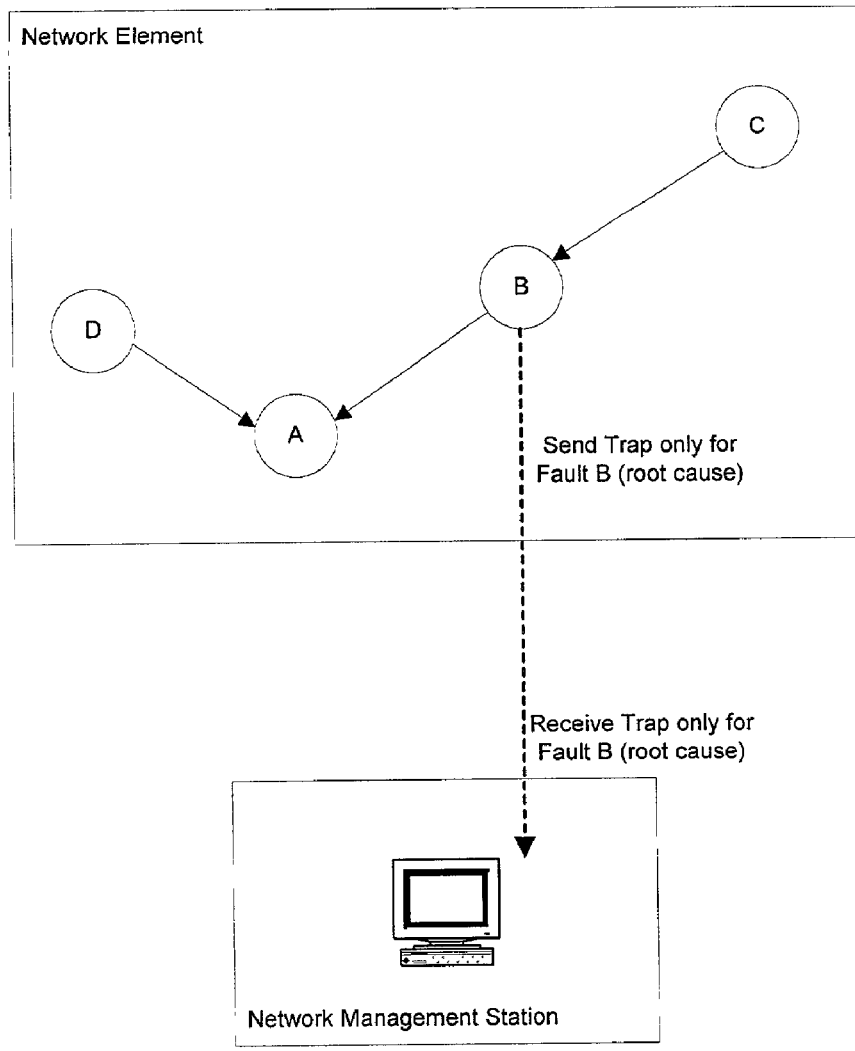
FIG. 4 illustrates the use of a directed acyclic graph.

As shown in FIG. 4, during operation, the fault correlation software in each network element "watches" the faults that occur in the entities represented by the nodes of the FIDAG and uses the FIDAG to analyze the significance of the faults. For example, when the system detects a fault in the entity represented by node B and sees that there is no fault in node A, the system concludes that fault B is a root-cause fault and sends a trap to report fault B to the management station. If fault C is subsequently detected, the system will see that fault C may be a side effect of fault B and, realizing that a trap has already been sent for fault B, the system will send no additional trap. Thus, the management station receives only one trap for B and the operator is presented with relevant information that reveals B as the root cause of the failure condition. The management station and the operator are not unduly distracted by fault C.

Because the fault correlation software is built directly into the network element, it can query related fault objects almost in real-time when processing a fault. For example, the fault correlation software can query fault objects that may not have actually reported a fault even though the underlying entity may have nonetheless been experiencing a fault. Using the previous example, when the fault correlation software detects the fault in the entity represented by node B, the software can proactively query entity A's status. Should A be found to be experiencing a fault, the software would treat A as the root cause, send a trap accordingly, and refrain from sending traps in response to the B and C faults. As a result, faults are more visible and fault detection can be more timely, leading to more effective correlation results. Performing proactive queries from the management station or from an external fault correlation engine would be slower and more expensive.

Figure 5:
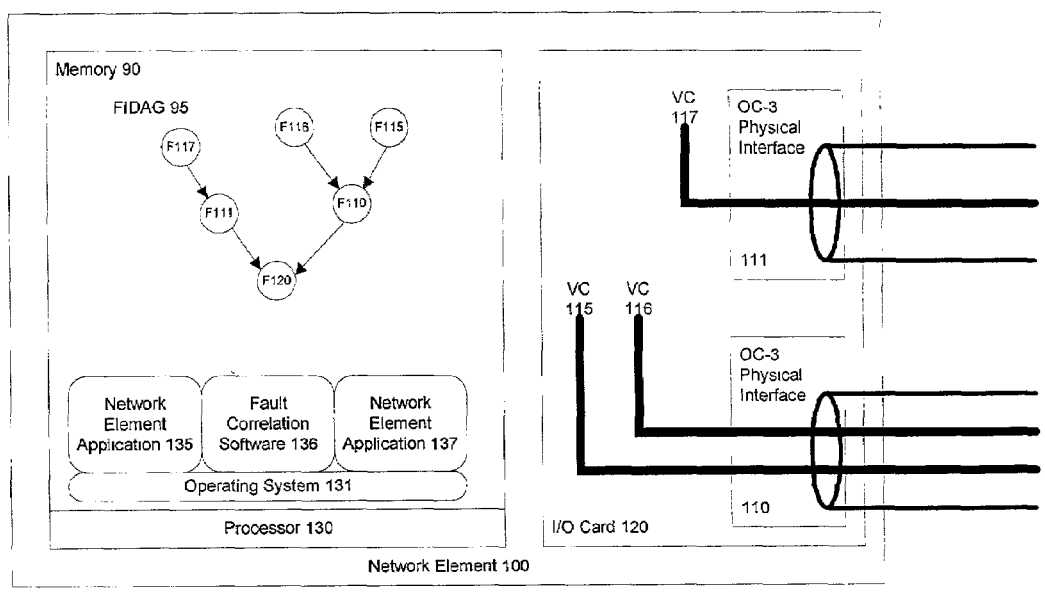
FIG. 5 is a block diagram of a network element.

As shown in FIG. 5, in an example implementation in a network element 100, a memory 90 stores a FIDAG 95 in the form of a data structure that includes nodes for entities 110, 111, 115, 116, 117, and 120 that are part of the network element. Entities 110, 111, and 120 are physical entity (physical interfaces and an I/O card) while entities 115, 116, and 117 are logical entities (virtual circuits). Each of these entities has a software object representation in the FIDAG (F110 represents 110, F111 represents 111, and so forth).

The edges in the FIDAG encapsulate the causal relationships among the nodes. Fault correlation software 136 is also stored in memory 90 as are conventional network element applications 134, 136 and an operating system 131. A processor 130 runs the operating system, the router applications, and the fault correlation software. The fault correlation software causes the processor to respond to fault notifications (F110, F111, F115, F116, F117, F120) by traversing the FIDAG and determining whether a given fault is caused by other faults.

EXAMPLE A

If virtual circuit 117 is disconnected unexpectedly while the OC-3 physical interface 111 is functioning flawlessly, then the root cause of circuit 117's disconnect is circuit 117 itself. When circuit 117 disconnects, the fault correlation software is notified of this event. As it traverses the FIDAG in modified pre-order, starting from F117, it will encounter F111. As it encounters F111, it verifies whether the OC-3 physical interface 111 is functioning without fault. If there is no fault in interface 111, then the software concludes that circuit 117 is a root cause fault and sends a trap reporting circuit 117 as a root cause fault. FIDAG traversal stops once a root cause fault is found.

Modified pre-order is a technique of recursively visiting the nodes of a directed acyclic graph in which a given root is processed first, then any sub-graph. The pseudo-code to execute a modified pre-order traversal starting from a given node would resemble the following:

```
preorder (node)
begin
    visit node;
    if node has no child, return;
    for each of node's children child do
        preorder (child);
    end for;
    return;
end;
```

Using the FIDAG in FIG. 3 as an example, if one were to execute a modified pre-order traversal starting from node 82, i.e., execute preorder (82), the order in which the nodes in the FIDAG are visited would be as follows:

82, 80, D, A 70, B 74, A 70

For our purpose, however, the modified pre-order traversal stops as soon as the root cause fault is found.

EXAMPLE B

If the OC-3 physical interface 110 malfunctions, then virtual circuits 115 and 116 will be disconnected. The root cause lies with interface 110. The fault correlation software is notified of three faults, those of F115, F116, and F110. Depending on the order in which the faults are recognized by the fault correlation software, two sub-cases emerge.

(Case B1) If F110's fault is recognized or reported first, then as the fault correlation software traverses the FIDAG in modified pre-order starting from F110. It will arrive at F120. It will verify F120's corresponding entity and see that I/O card 120 is functioning properly. It then concludes that F110 is a root-cause fault and sends a corresponding trap for F110. When faults F115 and F116 are later recognized or reported, the software will traverse the FIDAG in modified pre-order starting from F115 and F116 respectively. In each case, it will again arrive at F110 and find that F110 is the root cause. Since the software can remember the fact that it has sent a trap for fault F110, no additional trap is sent.

(Case B2) If either F115 or F116's fault is recognized or reported first, the software will traverse the FIDAG in modified pre-order starting from F115 or F116. The software will reach F110 and verify the state of interface 110. The software will realize that interface 110 is faulty (malfunctioning) and conclude that F110 is the root cause fault. A trap is sent for F110 but no trap is sent for F115 or F116. When fault F110 is later recognized or reported, the software would not send another trap as it remembers that it has sent a trap for F110 before. In both cases, regardless of the order of faults being recognized or reported, we arrive at the desired outcome, i.e., one trap is sent for the root cause fault F110.

Other implementations are within the scope of the following claims.

The invention claimed is:

1. A method comprising:
   at a network element, processing information to identify network faults that are contributing to failure of the network element in which the identified network faults are a cause of other network faults occurring in the network element, and
   based on the results of the information processing, sending to a network management station traps with respect to a subset of the network faults that are occurring, the subset including at least some of the network faults that were identified as having a causal relationship to the other network faults.

2. The method of claim 1 in which the information is processed using a directed acyclic graph.

3. The method of claim 2 in which nodes of the graph represent entities of the network element.

4. The method of claim 1 in which the result of the processing comprises information about the causal relationships among at least some of the network faults.

5. The method of claim 1 also including
   requesting fault information from an entity that is part of the network element and which has not triggered a fault notice to determine if there is a network fault associated with the network element.

6. The method of claim 1 also including
   reporting the traps to an operator of the network management station.

7. Apparatus comprising
   a network element having
      network entities that are subject to network faults, wherein the network faults of at least some of the network entities cause or are caused by network faults of at least some other network entities, and
      a computer program stored on a computer-readable medium comprising instructions to cause a programmable component in the network element to
   process information to identify network faults that contribute to failure of the network element in which the identified network faults are a cause of other network faults, and
   based on the results of the information processing, send to a network management station traps with respect to a subset of the network faults that are occurring at the network entities, the subset including at least some of the network faults that were identified as having a causal relationship to the other network faults.

8. A computer program stored on a computer-readable medium comprising instructions to cause a computer to:
   determine whether network faults are contributing to failure of a network element in which the identified network faults are a cause of other network faults occurring in entities of the network element, and
   based on the results of the determination, send to a network management station traps with respect to a subset of the network faults that are occurring, the subset including a least some of the network faults that were identified as having a causal relationship to the other network faults.

9. The computer program of claim 8 in which the information comprises a directed acyclic graph of nodes.

10. The apparatus of claim 7, wherein one network fault directly causes another network fault or is directly caused by another network fault.

11. The method of claim 1 in which the subset does not include at least some cascading network faults that are triggered by the identified network faults.

* * * * *